(12) United States Patent
Didcock

(10) Patent No.: US 6,396,907 B1
(45) Date of Patent: *May 28, 2002

(54) UNIFIED MESSAGING SYSTEM AND METHOD PROVIDING CACHED MESSAGE STREAMS

(75) Inventor: Cliff Didcock, Wantage (GB)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,536

(22) Filed: Oct. 9, 1997

Related U.S. Application Data

(60) Provisional application No. 60/060,959, filed on Oct. 6, 1997.

(51) Int. Cl.$^7$ ................................................ H04M 1/64
(52) U.S. Cl. ................................ 379/88.17; 379/88.13; 379/88.14; 709/231
(58) Field of Search ............................. 379/67.1, 88.13, 379/88.17, 88.14, 88.22, 88.23, 88.25, 88.27; 709/230, 231, 217–219, 248, 232

(56) References Cited

U.S. PATENT DOCUMENTS

| | | |
|---|---|---|
| 4,837,798 A | 6/1989 | Cohen et al. |
| 4,866,755 A | 9/1989 | Hashimoto |

(List continued on next page.)

OTHER PUBLICATIONS

RealAudio Player 1.0 [online], Progressive Networks, Inc., [retrieved Jul. 20, 1999]. Retrieved from Internet: <URL-:www.web-venture.com/inteletravel/download/real.html>, Jul. 1995.*

Baugher, M., Media Transports and Distributed Multimedia Flows, Mar. 1992, Proceedings of the 1992 ACM/SIGAPP Symposium on Applied Computing, pp. 1132–1143.*

Jonas, K., Kretschmer, M., Audio Streaming on the Internet, Jul. 1997, Industrial Electronics, 1997. ISIE '97 Proeceedings, vol. 1, pp. SS71–SS76.*

Barbara, D., The AudioWeb, Nov. 1997, Proceedings of the Sixth International Conference on Information and Knowledge Management, Nov. 1997, pp. 97–104.*

Margulies, E., Understanding the Voice–Enabled Internet, Aug. 1996, Flatiron Publishing, Inc., ISBN 0–936648–91–0, Chapt. 10, pp. 10–12 and 20–22.*

(List continued on next page.)

Primary Examiner—Fan Tsang
Assistant Examiner—Roland G. Foster
(74) Attorney, Agent, or Firm—Haverstock & Owens LLP

(57) ABSTRACT

In a unified messaging system, a background stream manager streams message data from a file server into a local storage resource upon a voice server. A foreground stream manager concurrently streams message data from the local storage resource to a telephone. The background stream manager determines whether the amount of contiguous message data within the local storage resource relative to a current message playback position exceeds a high threshold value. If so, the background stream manager interrupts message data streaming into the local storage resource. The foreground stream manager determines whether the amount of contiguous message data remaining to be streamed from the local storage resource relative to the current message playback position has dropped below a low threshold value. If so, the background stream manager resumes message data streaming into the local storage resource. Rather than streaming message data to a client computer, the foreground stream manager issues playback position notifications, which the client computer uses to update a graphical streaming control window.

27 Claims, 8 Drawing Sheets

U.S. PATENT DOCUMENTS

| | | | |
|---|---|---|---|
| 5,475,738 A | | 12/1995 | Penzias |
| 5,479,411 A | | 12/1995 | Klein |
| 5,524,137 A | | 6/1996 | Rhee |
| 5,530,740 A | | 6/1996 | Irribarren et al. |
| 5,557,659 A | * | 9/1996 | Hyde-Thomson ........ 379/88.13 |
| 5,625,675 A | * | 4/1997 | Katsumaru et al. ...... 379/88.25 |
| 5,657,376 A | * | 8/1997 | Espeut et al. ............ 379/88.17 |
| 5,680,443 A | * | 10/1997 | Kasday et al. ........... 379/88.13 |
| 5,712,901 A | | 1/1998 | Meermans |
| 5,734,119 A | * | 3/1998 | France et al. .................. 84/622 |
| 5,799,063 A | * | 8/1998 | Krane ..................... 379/88.17 |
| 5,825,854 A | | 10/1998 | Larson et al. |
| 5,881,245 A | * | 3/1999 | Thompson .................. 709/219 |
| 5,915,001 A | * | 6/1999 | Uppaluru ................. 379/88.22 |
| 5,920,559 A | * | 7/1999 | Awaji ......................... 370/392 |
| 5,943,398 A | | 8/1999 | Klein et al. |
| 5,966,685 A | | 10/1999 | Flanagan et al. |
| 5,987,100 A | | 11/1999 | Fortman et al. |
| 5,991,365 A | | 11/1999 | Pizano et al. |
| 6,061,718 A | | 5/2000 | Nelson |

OTHER PUBLICATIONS

Mack, S., Broadcasting via Internet, J. Webster (ed.), Wiley Encyclopedia of Elect. & Electronics Eng. Online [online], Dec. 1999 [retrieved Mar. 21, 2000]. Retrieved from Internet: <URL:http://wwwinterscience.wiley.com:83/eeee/06/1506/W. 1506–toc.html>.*

Tom Vincent "Digital Audio and Disabled Learners" Institute of Educational Technology, The Open University, UK, p. 66.

* cited by examiner

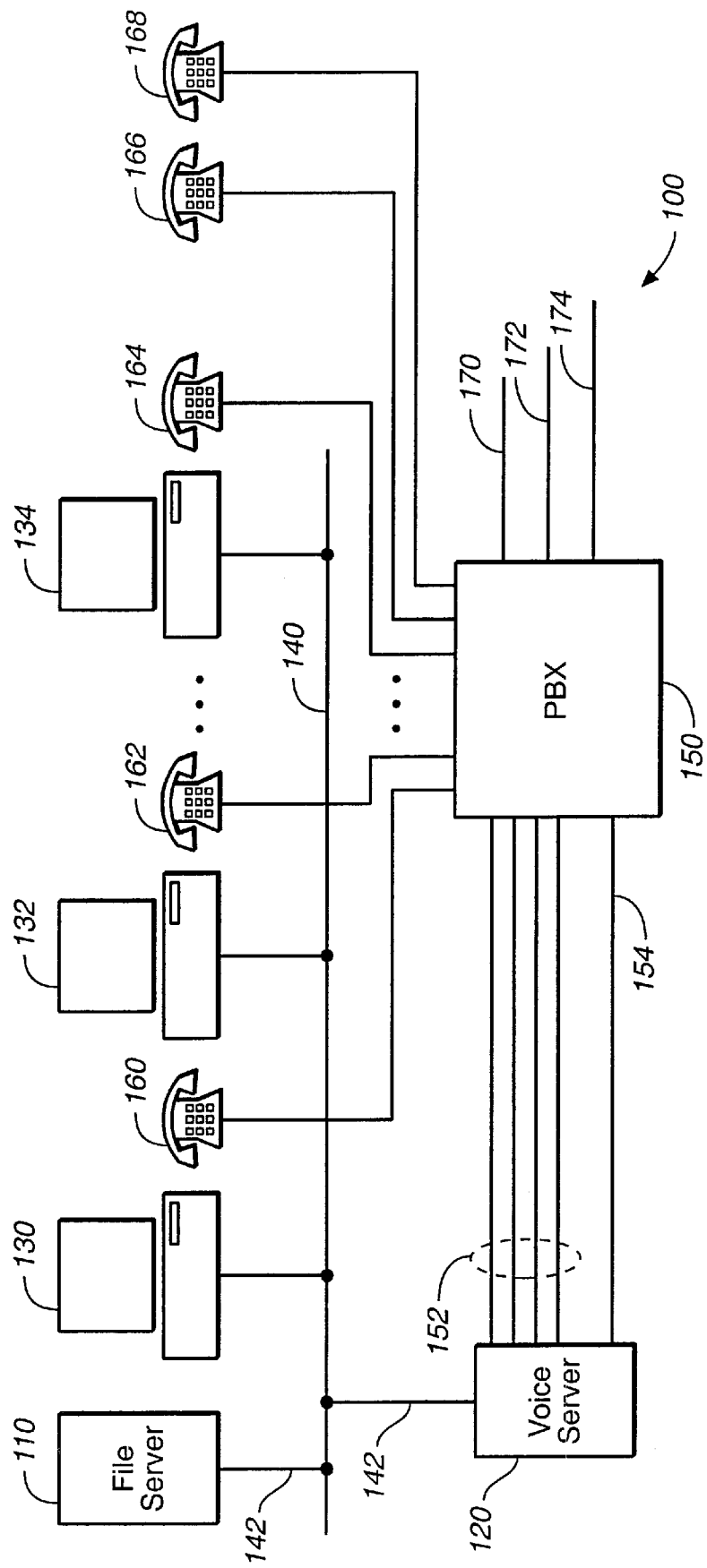
FIG._1

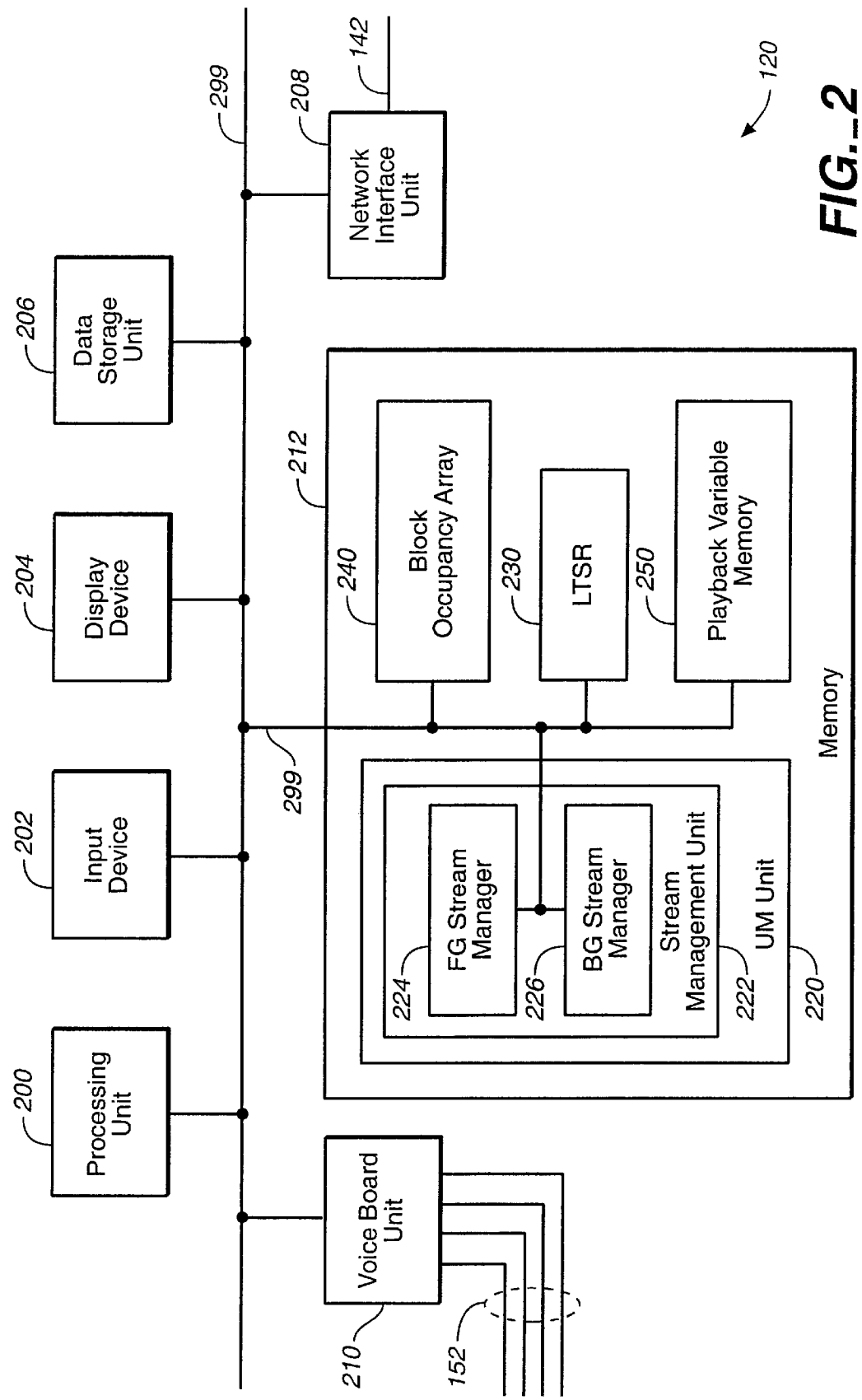
FIG._2

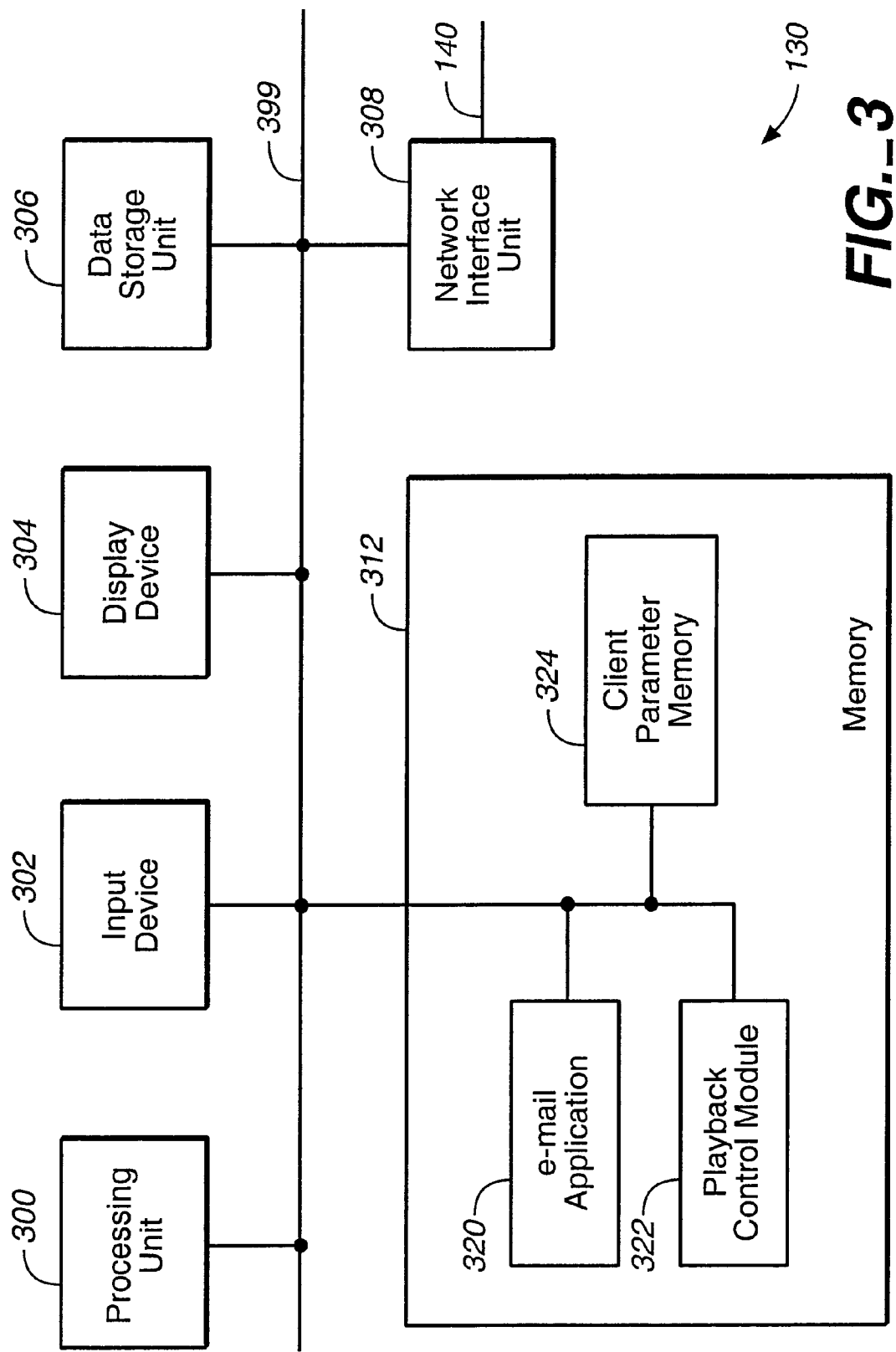

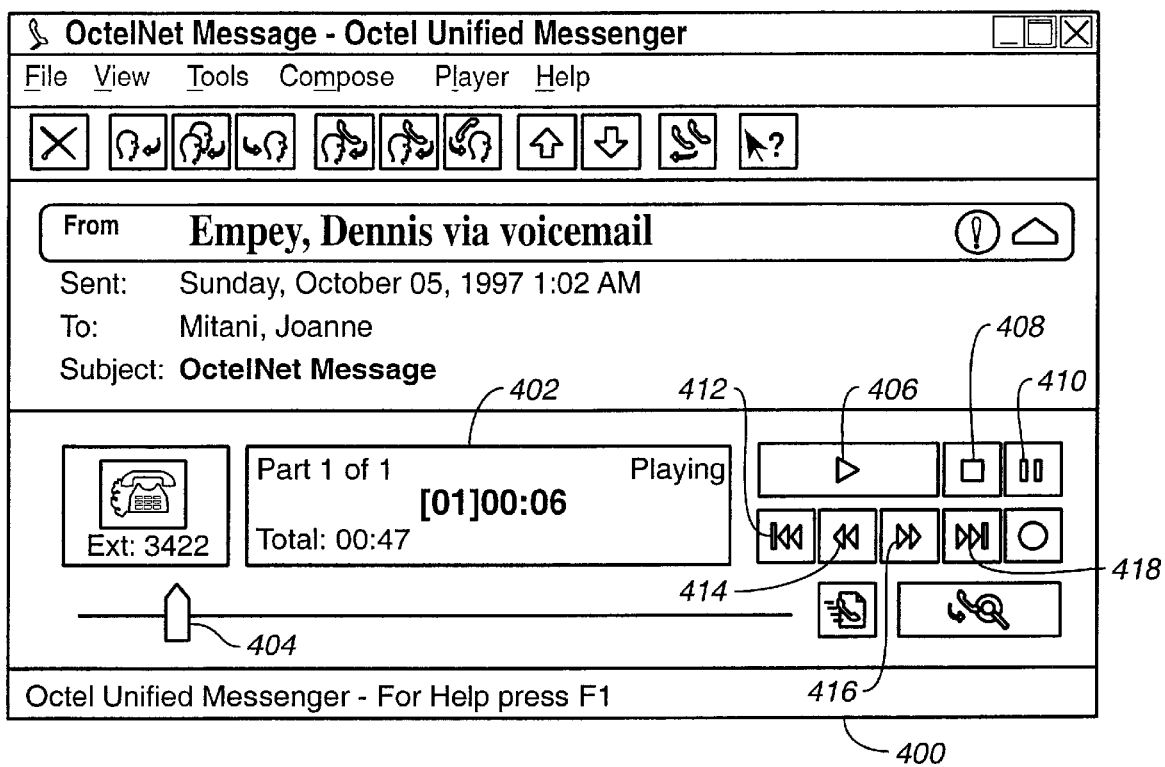
FIG._4

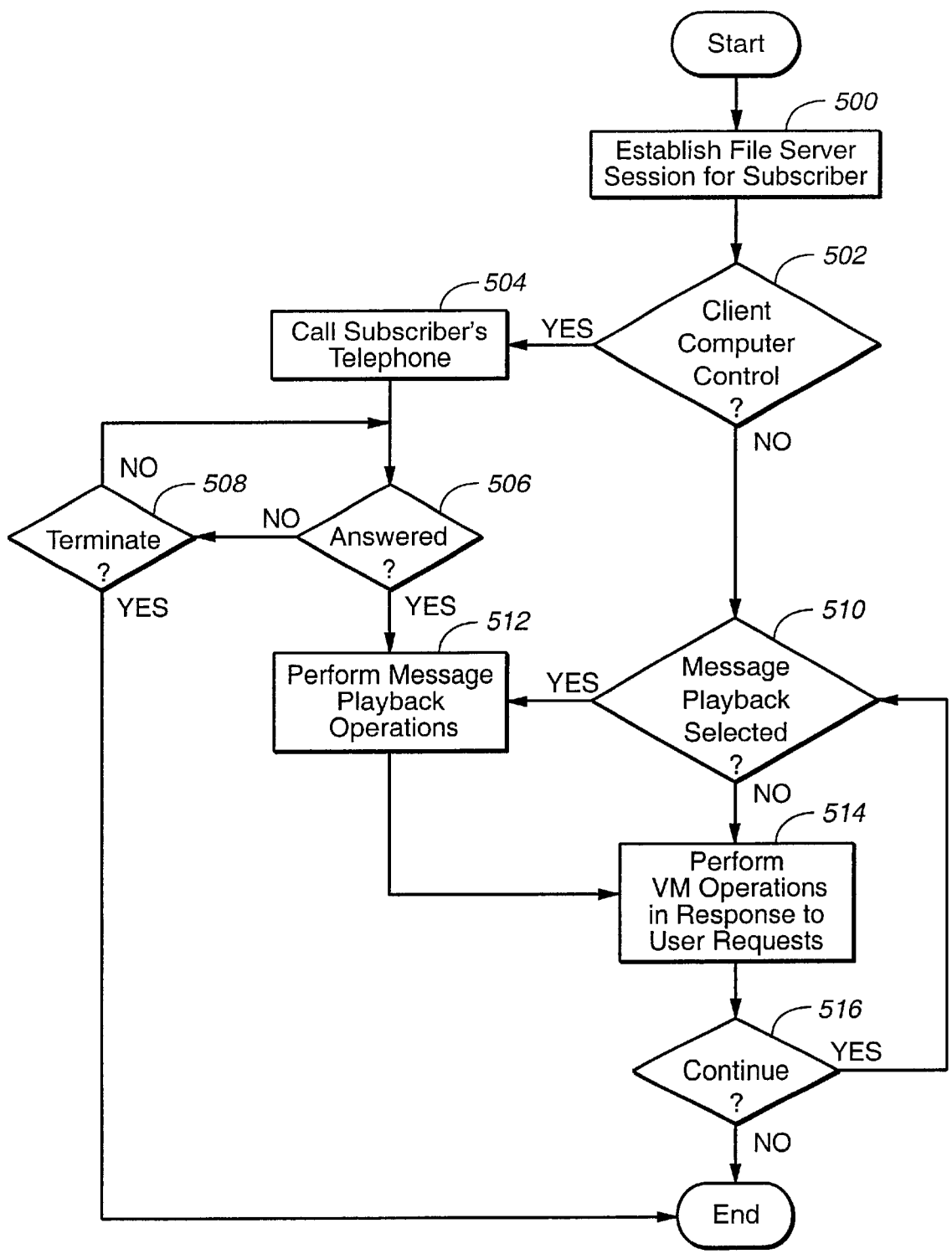
FIG._5

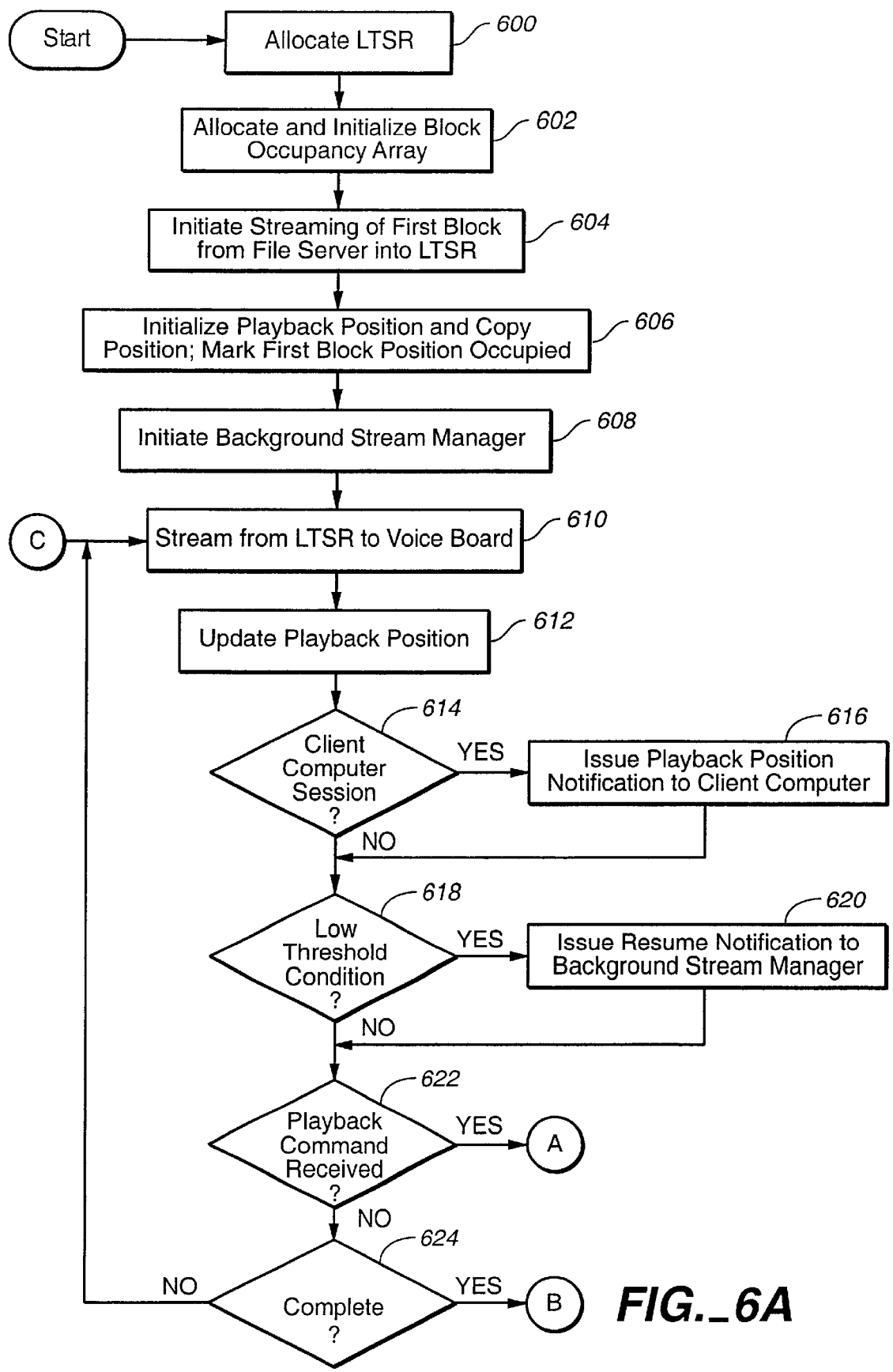
FIG._6A

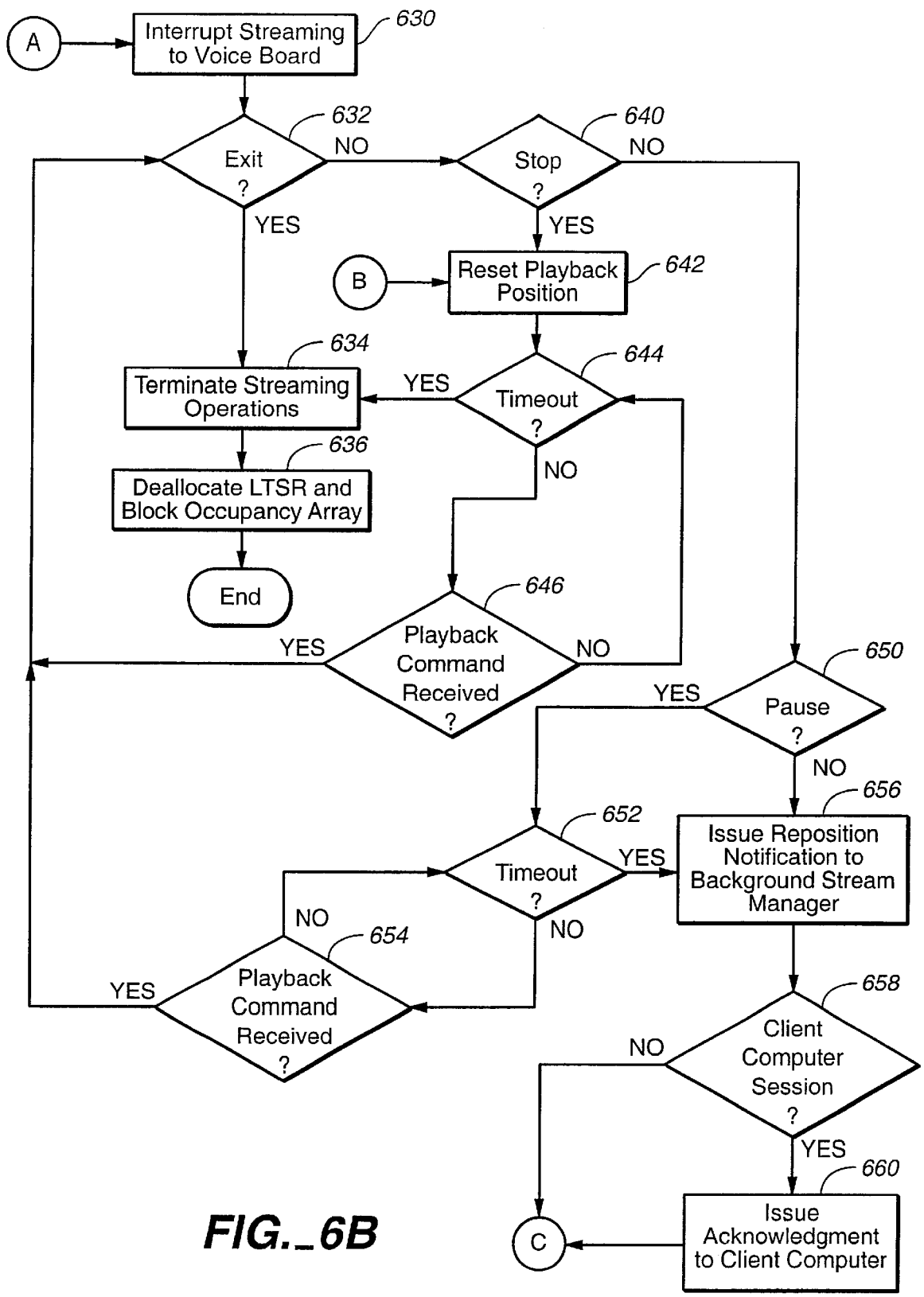
FIG._6B

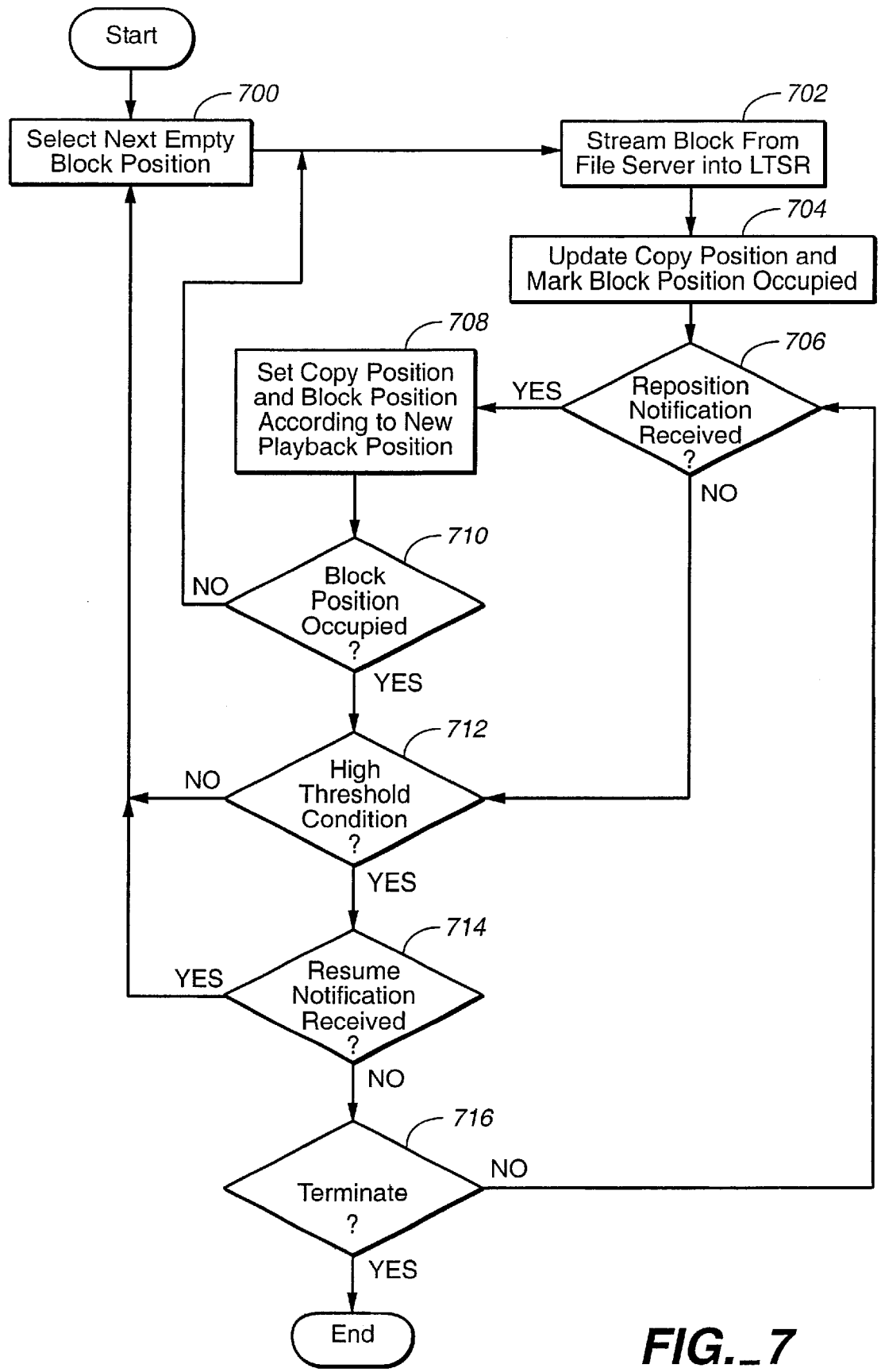
FIG._7

UNIFIED MESSAGING SYSTEM AND METHOD PROVIDING CACHED MESSAGE STREAMS

CROSS-REFERENCE TO RELATED PUBLICATIONS

This application is a regular U.S. Application filed from and claiming priority of provisional application Ser. No. 60/060,959 filed on Oct. 6, 1997 and entitled "Unified Messaging System and Method Providing Cached Message Streams." This application relates to and incorporates by reference U.S. Pat. No. 5,557,659, entitled "Electronic Mail System Having Integrated Voice Messages."

BACKGROUND OF THE INVENTION

1.1 Field of the Invention

The present invention relates to systems and methods for voice messaging, as well as systems and methods for data streaming. More particularly, the present invention is a system and method for unified messaging providing cached message streams that can be selectively controlled through Dual-Tone Multifrequency (DTMF) signals or indirect graphical means.

1.2 Description of the Background Art

Data streaming has become a well-known technique for delivering potentially large amounts of paced-content information on-demand across a network. To initiate conventional data streaming operations, a client requests or establishes a streaming session with a server, in accordance with particular media processing requirements. In response, the server transmits data packets to the client at a controlled delivery rate. The client continuously processes the data packets as they are received, and thus the data streaming operations facilitate low-latency, quasi-continuous media transfer from the server to the client. The client additionally issues control commands to the server, such as rewind, fast-forward, or stop, in response to user input. Progressive Networks' RealAudio, RealVideo, and RealPlayer products (Progressive Networks, Seattle, Wash.), designed for distributing real-time media over the Internet, provide examples of the manners in which data streaming techniques are currently employed.

Unified or integrated messaging systems perform message transfers across a computer network. In a unified messaging system, a voice server is coupled to a Private Branch Exchange (PBX) and a computer network. The computer network couples users' computers to an electronic mail (e-mail) server, and the PBX couples computer users' telephones to a telephone network. Each computer user's e-mail in-box provides message notification as well as access to messaging services for e-mail messages, voice messages, and possibly other types of messages such as faxes. An example of unified messaging software is Lucent Technologies' Unified Messenger (Lucent Technologies, Octel Messaging Division, Milpitas, Calif.).

Voice message playback involves a time-based delivery of potentially large amounts of data on demand. Thus, data streaming techniques can be advantageously employed in unified messaging environments. Prior art unified messaging systems stream voice messages from an e-mail server to a user's computer. Based upon user preferences and/or hardware configuration, the user's computer will either play a voice message via multimedia hardware, or stream the message to the voice server for playback over the user's telephone.

Unfortunately, the lines or links that couple each user to the computer network are likely to be among the network's slowest links. Voice messages to be played over a user's telephone may therefore be particularly susceptible to interruption or breakup during playback, which is clearly unacceptable. What is needed is a means for ensuring that telephone-based voice message playback is essentially independent of the speed of the links coupling users' computers to the network.

SUMMARY OF THE INVENTION

The present invention is a unified messaging system and method providing cached message streams. The system comprises a file server and a set of client computers coupled to a computer network; and a voice server coupled to the computer network as well as a Private Branch Exchange (PBX). The PBX is further coupled to a set of telephones. Preferably, a telephone is associated with each client computer.

The file server and client computers, in conjunction with conventional networking software, provide an electronic mail (e-mail) system through which computer users can exchange messages and message attachments. The voice server facilitates the exchange of information between the computer network and telephone users, and comprises a processing unit, a data storage unit, a network interface unit, a voice board unit, and a memory wherein a unified messaging unit resides. The unified messaging unit provides telephone answering and automated attendant functions to callers, and voice messaging services such as message inquiry, playback, forward, and reply to a set of subscribers.

The unified messaging unit includes a stream management unit comprising a foreground stream manager and a background stream manager. In response to a playback-to-telephone request received via either a telephone or a client computer, the stream management unit allocates a Local Temporary Storage Resource (LTSR) and a block occupancy array within the voice server's memory. The LTSR serves as a temporary message cache, which a first message data stream populates and a second message data stream simultaneously depletes, as described hereafter.

The stream management unit treats a message stored upon the file server as a sequence of N data blocks, where each of blocks 1 through (Nu-) comprises a fixed-size portion of the message. A final message data block, which includes an end-of-message indicator, can be less than the fixed-size. The block occupancy array indicates which blocks comprising a message have been streamed from the file server into the LTSR.

After allocating the LTSR and block occupancy array, the stream management unit initiates the streaming of a first message block from the file server into the LTSR, and marks a first entry or element within the block occupancy array as occupied. The stream management unit next sequentially initiates the execution of the background stream manager and the foreground stream manager.

The background stream manager directs the streaming of message data blocks from the file server into the LTSR, while the foreground stream manager concurrently directs the streaming of message data from the LTSR to the voice board unit (and hence a user's telephone). The background stream manager maintains a copy position variable that indicates a next address at which a data block is to be streamed into the LTSR, and updates block occupancy array entries. The foreground stream manager maintains a playback position variable that indicates a current address within the LTSR from which message data has been most-recently streamed to the voice board unit.

The background stream manager monitors the amount of contiguous message data that has been streamed into the LTSR relative to the current playback position, and determines whether a high threshold parameter has been exceeded. If so, the background stream manager interrupts the streaming of message data from the file server into the LTSR. The foreground stream manager monitors the amount of contiguous message data within the LTSR yet to be streamed to the voice board unit relative to the current playback position, and determines whether a low threshold parameter has been exceeded. If so, the foreground stream manager issues a resume notification to the background stream manager, thereby resuming message data streaming from the file server into the LTSR. Through the high and low threshold parameters, the present invention facilitates the periodic interruption of streaming from the file server, while allowing for uninterrupted stream delivery to the voice board unit. This in turn maximizes the file server's ability to efficiently perform other tasks while streaming to the voice board unit occurs.

The foreground stream manager is responsive to playback commands received from a telephone or a client computer. When a playback command indicates that a jump forward or backward to a new playback position is required, the background stream manager determines whether the message data block associated with the new playback position is already present within the LTSR, and avoids any message data block re-streaming if such is the case.

Each client computer preferably includes a playback control module, which generates and maintains a graphical window or interface that shows playback position information relative to overall message size or length. The graphical window also provides user-selectable buttons corresponding to playback commands such as play, stop, pause, jump-to-beginning, jump back k seconds, jump forward k seconds, and forward-to-end. In addition, the graphical window provides a message position slider, the selection of which facilitates the generation of a jump-to-user-defined-position command.

The present invention avoids streaming the message data itself (i.e., the audio data comprising a voice message) to a client computer. Rather, the foreground stream manager issues playback position notifications to the client computer as message data is streamed from the LTSR to the voice board unit. The client computer's playback control module updates the graphical window in response to receipt of the playback position notifications. The present invention thus effectively eliminates the message interruption and breakup problems found in the prior art, which arise when message data is streamed to client computers over slow network links.

BRIEF DESCRIPTION OF THE DRAWINGS

FIG. 1 is a block diagram of a preferred embodiment of a unified messaging system constructed in accordance with the present invention;

FIG. 2 is a block diagram of a preferred embodiment of a voice server constructed in accordance with the present invention;

FIG. 3 is a block diagram of a preferred embodiment of a client computer constructed in accordance with the present invention;

FIG. 4 is a graphical representation of a preferred playback control interface of the present invention;

FIG. 5 is a flowchart of a preferred method for maintaining a voice messaging session with a subscriber in the present invention;

FIGS. 6A and 6B are a flowchart of a preferred method for performing telephone-based message playback operations in the present invention; and FIG. 7 is a flowchart of a preferred method for performing background streaming operations in the present invention.

DESCRIPTION OF THE PREFERRED EMBODIMENTS

Referring now to FIG. 1, a block diagram of a preferred embodiment of a unified messaging system 100 constructed in accordance with the present invention is shown. The unified messaging system 100 comprises a file server 110, a voice server 120, and a plurality of computers 130, 132, 134 coupled to a computer network 140; and a Private Branch Exchange (PBX) 150 or telephone system switch coupled to the voice server 120, a plurality of telephones 160, 162, 164, 166, 168, and a set of trunk lines 170, 172, 174. Preferably, a telephone 160, 162, 164 is associated with each computer 130, 132, 134.

In the preferred embodiment, the file server 110 and the voice server 120 are each coupled to the computer network 140 via a high-speed link 142. The couplings between the voice server 120 and the PBX 150 conventionally include a set of telephone lines 152 and a PBX integration line 154. Those skilled in the art will understand that the trunk lines 170, 172, 174 facilitate coupling between the PBX and a telephone network, such as a Public Switched Telephone Network (PSTN). The unified messaging system 100 shown in FIG. 1 is analogous to that described in U.S. Pat. No. 5,557,659, entitled "Electronic Mail System Having Integrated Voice Messages," which is incorporated herein by reference.

In the present invention, conventional software executing upon the file server 110, in conjunction with client software executing upon each computer 130, 132, 134, provides networked file transfer services, group access to software applications, and an electronic mail (e-mail) system through which computer users can transfer messages as well as message attachments between their computers 130, 132, 134 via the file server 110. In an exemplary embodiment, Microsoft Exchange™ software (Microsoft Corporation, Redmond, Wash.) provides such functionality. Within the file server 110, an e-mail directory associates each computer user's name with a message storage location, or "in-box," and a network address, in a manner that will be readily understood by those skilled in the art.

The voice server 120 facilitates the exchange of messages between the computer network 140 and a telephone system user. Referring also now to FIG. 2, a block diagram of a preferred embodiment of a voice server 120 constructed in accordance with the present invention is shown. The voice server 120 comprises a processing unit 200, an input device 202, a display device 204, a data storage unit 206, a network interface unit 208, a voice board unit 210, and a memory 212 in which a Unified Messaging (UM) unit 220, a Local Temporary Storage Resource (LTSR) 230, a block occupancy array 240, and a playback variable memory 250 reside. Each element within the voice server 120 is coupled to a common bus 299.

In the preferred embodiment, the processing unit 200, input device 202, display device 204, and data storage unit 206 are conventional. The network interface unit 208 preferably comprises conventional circuitry that manages data transfers between the voice server 120 and the computer network 140. The voice board unit 210 preferably comprises conventional circuitry that interfaces a computer system with telephone switching equipment and provides telephony voice processing functions.

The UM unit 220 comprises software (i.e., a set of program instructions executable by the processing unit 200) that provides services such as call answering and automated attendant to callers, as well as voice messaging services including message store and forward plus message inquiry and playback operations to voice messaging subscribers. In the preferred embodiment, the subscribers include a group of computer users identified in the e-mail directory, that is, having a computer 130, 132, 134 coupled to the computer network 140. In the present invention, the UM unit 220 includes a stream management unit 222 having a foreground stream manager 224 and a background stream manager 226. In response to a playback-to-telephone request received via either a telephone or a client computer 130, 132, 134, the stream management unit 222 performs telephone-based message playback operations.

During telephone-based message playback operations, the stream management unit 222 directs the streaming of a message from the file server 110 into the LTSR 230 in conjunction with the simultaneous streaming of the message from the LTSR 230 to the voice board unit 210, in the manner described in detail below with reference to FIGS. 6A, 6B, and 7. In the preferred embodiment, the stream management unit 222 allocates storage for the LTSR 230 upon initiation of telephone-based message playback operations, and deallocates the LTSR 230 once such operations are complete. Thus, the LTSR 230 serves as a temporary cache for message streams in the present invention. Those skilled in the art will recognize that the LTSR 230 could be implemented upon the data storage unit 206 rather than within the memory 212.

The stream management unit 222 treats a message to be streamed from the file server 110 as a sequence of data blocks. Each block comprises a fixed-size "chunk" or portion of the message, with the exception of a final block, which can be less than the fixed-size. In the preferred embodiment, a block comprises 16 kilobytes of data. Preferably, an initial block includes message header information such as message size, and the final block includes an end-of-message indicator. The block occupancy array 240 is a dynamically-allocated array or list that indicates which blocks comprising a message have been streamed into the LTSR 230.

The playback variable memory 250 comprises storage for variables that the stream management unit 222 uses to perform cached message streaming operations. These variables include 1) a playback position variable that specifies a most-current message location or address, for which data has been streamed to the voice board unit 210; 2) a copy position variable that specifies an LTSR location or address into which a block is to be streamed; 3) a block number variable used to reference an entry within the block occupancy array 240; 4) a high threshold variable or parameter that defines an upper limit to the number of blocks continuously streamed into the LTSR 230 relative to the playback position before streaming from the file server 110 is interrupted and paused; and 5) a low threshold variable or parameter that defines a minimum amount of data within the LTSR 230 that remains to be streamed to the voice board unit 220 relative to the playback position before block streaming from the file server 110 is resumed.

The stream management unit 222 is responsive to playback commands received via either a telephone or a client computer 130, 132, 134. Preferably, the playback commands include begin, pause, and stop message playback; jump forward a predetermined interval and jump backward a predetermined interval within a message; jump to beginning and jump to end of message; as well as transfer to voice messaging operations such as message forward, reply, save, delete, and select next message. In the event that the playback commands are received from a client computer 130, 132, 134, the playback commands may also include jump backward or forward to an arbitrary position (i.e., jump to a user-defined position) within the message in accordance with the movement of a playback position slider 404, as shown below with reference to FIG. 4.

When a client computer 130, 132, 134 controls telephone-based message playback operations, the present invention does not stream the message itself to the client computer 130, 132, 134. That is, the client computer 130, 132, 134 does not receive any audio data. Rather, the stream management unit 222 issues playback position updates to the client computer 130, 132, 134 as a message is streamed from the LTSR 230 to the voice board unit 210. Telephone-based message playback operations in the present invention therefore avoid the message interruption or breakup problems that occur in the prior art as a result of slow links that couple client computers 130, 132, 134 to the computer network 140.

In an exemplary embodiment, the voice server 120 is a personal computer having a 200 MHz or faster Intel Pentium™ processor (Intel Corporation, Santa Clara, Calif.); a Redundant Array of Inexpensive Disks (RAID) drive serving as the data storage unit 206; an Ethernet-based network interface unit 208; a set of Rhetorex voice boards (Rhetorex Corporation, San Jose, Calif.); and 128 Megabytes (MB) of Random Access Memory (RAM) wherein the stream management unit 222, the LTSR 230, the block occupancy array 240, and the playback variable memory 250, as implemented via Lucent Technologies' Unified Messenger software (Lucent Technologies, Octel Messaging Division, Milpitas, Calif.), reside.

Referring also now to FIG. 3, a block diagram of a preferred embodiment of a client computer 130 of the present invention is shown. The client computer 130 comprises a processing unit 300, an input device 302, a display device 304, a data storage device 306, a network interface unit 308, and a memory 312 wherein an e-mail application 320, a playback control module 322, and a client parameter memory 324 reside. Each element of the client computer 130 is coupled via a common bus 399.

With the exception of the playback control module 322, each element of the client computer 130 is conventional. The playback control module 322 provides a graphical interface through which a client computer user can control either multimedia-based or telephone-based message playback operations. Referring also now to FIG. 4, a graphical representation of a preferred playback control interface 400 provided by the playback control module 322 is shown. The playback control interface 400 comprises a graphical window having a playback status window 402; a playback position slider 404; a play button 406; a stop button 408; a pause button 410; a jump-to-beginning button 412, a jump back k seconds button 414; a jump forward k seconds button 416; and a forward-to-end (and/or jump to next message/next message part) button 418. In the preferred embodiment, k equals 5. The playback control interface 400 also includes buttons for selecting voice messaging functions such as delete, reply, and message forward. In response to user selection of a button or movement of the playback position slider 404, the playback control module 322 issues a corresponding playback command to the voice server 120.

The client parameter memory 324 stores user-specific data and preferences, including a user identification (ID), user security information such as an e-mail password, and a playback mode indicator that specifies whether message playback operations are to occur via local multimedia or the user's telephone 160, 162, 164. In response to a computer user's selection of a voice message displayed in their e-mail in-box, the e-mail application 320 launches the playback control module 322. Multimedia-based message playback operations preferably occur in a conventional manner. In the event that message playback operations are to be directed to the user's telephone, the playback control module 322 issues a session request to the voice server 120 to initiate telephone-based message playback operations. In the preferred embodiment, the session request includes the user ID, the user security information, and a reference to the selected message.

During telephone-based message playback operations, the playback control module 322 issues playback commands to the voice server 120 in response to user input. The playback control module 322 additionally processes playback position notifications received from the voice server 120, where each playback position notification indicates a current point in a message at which playback is occurring. The playback control module 322 uses the playback position notifications to update the playback status window 402 and playback position slider 404 in a manner that will be understood by those skilled in the art.

Each client computer 130, 132, 134 preferably has the structure described above, and in an exemplary embodiment is a personal computer having a 120 MHz or faster Intel Pentium™ processor; a 1.0 Gigabyte or larger disk drive; an Ethernet-based network interface unit 308; and 32 MB of RAM wherein the e-mail application 320, the playback control module 322, and the client parameter memory 324 reside, as implemented via Lucent Technologies' Unified Messenger and Microsoft Exchange™ client software.

In the present invention, the voice server 120 initiates a voice messaging session with a subscriber in response to receipt of an incoming telephone call from a subscriber, or receipt of a session request from a client computer 130, 132, 134. Referring now to FIG. 5, a flowchart of a preferred method for maintaining a voice messaging session with a subscriber is shown. The preferred method begins in step 500 with the unified messaging unit 220 establishing a file server session for the subscriber in response to a subscriber's telephone call or receipt of a session request. The unified messaging unit 220 preferably relies upon a user ID and user password as entered by the subscriber via a telephone keypad, or specified in the session request, to establish the file server session. Next, the unified messaging unit 220 determines whether the voice messaging session has been established via client computer in step 502. If so, the unified messaging unit 220 calls the subscriber's telephone 130, 132, 134 in step 504. The unified messaging unit 220 then determines whether the subscriber's telephone 130, 132, 134 has been answered in step 506. If so, the stream management unit 222 performs telephone-based message playback operations in step 512, in the manner described in detail below with reference to FIGS. 6A, 6B, and 7. If the subscriber's telephone 130, 132, 134 is not answered, the unified messaging unit 220 determines whether to terminate operations in step 508, in which case the preferred method ends.

If the voice messaging session has been initiated in response to a subscriber calling into the voice server 120, the unified messaging unit 220 determines whether a message playback command has been received in step 510. If so, the preferred method proceeds to step 512.

Following step 512, or after step 510, the unified messaging unit 220 performs other voice messaging operations in accordance with commands generated in response to subscriber input in step 514. The unified messaging unit 220 then determines whether to end the voice messaging session in step 516. If the session is to continue, the preferred method returns to step 510; otherwise, the preferred method ends.

Referring now to FIGS. 6A and 6B, a flowchart of a preferred method for performing telephone-based message playback operations is shown. The preferred method begins in step 600 with the stream management unit 222 allocating storage for the LTSR 230. Next, the stream management unit 222 allocates storage for the block occupancy array 240, and initializes its entries to indicate all block positions are empty in step 602. Following step 602, the stream management unit 222 uses the message reference specified in the session request, or selects a first message in the subscriber's in-box, to initiate streaming of a first block of the message from the file server 110 into the LTSR 230 in step 604. The stream management unit 222 then initializes the playback position variable to the LTSR address at which the first block begins; initializes the copy position variable to the starting address of the next block within the LTSR 230; and marks the first entry within the block occupancy array 240 as occupied in step 606. After step 606, the stream management unit 222 initiates execution of the background stream manager 226 in step 608, which performs threshold-based background streaming operations from the file server 110 into the LTSR 230 in the manner described hereafter.

Referring also now to FIG. 7, a flowchart of a preferred method for performing background streaming operations is shown. The steps shown in FIG. 7 are performed concurrent with the steps of FIGS. 6A and 6B, and are thus performed while the message is being delivered to the subscriber via the voice board unit 210. The preferred background streaming method begins in step 700 with the background stream manager 226 selecting a next empty block position within the LTSR 230. The background stream manager 226 then initiates the streaming of a next block from the file server 110 into the LTSR 230 at the address given by the copy position variable in step 702. Following step 702, the background stream manager 226 updates the copy position variable to the starting address of the next sequential block position within the LTSR 230, and marks the block position corresponding to the most-recently streamed block as occupied in step 704.

Upon completion of step 704, the background stream manager 226 determines whether a reposition notification has been received in step 706. Receipt of a reposition notification indicates that a playback command for jumping forward or backward within the message to a new playback position has been received, as further described below. Preferably, the reposition notification includes the value of the playback position variable as newly-updated in accordance with the playback command.

If a reposition notification has been received, the background stream manager 226 determines the value of the copy position variable and the position or element within the block occupancy array 240 that corresponds to the new playback position value in step 708. The background stream manager 226 then examines the block occupancy array 240 to determine whether the block corresponding to the new playback position has already been streamed into the LTSR 230 in step 710. If not, the preferred method returns to step 702.

If in step 710 the block position is occupied, the background stream manager 226 next determines whether the difference between the current copy position variable and the current playback position variable exceeds a high threshold value in step 712. Exceeding the high threshold value corresponds to a condition under which a sufficient amount of the message has been streamed from the file server 110 into the LTSR 230 to allow interruption of file server streaming for a target time period essentially without affecting the message playback operations. This in turn ensures efficient use of system resources, since the file server 110 is then free to perform other tasks. In the preferred embodiment, the high threshold value is 64 kilobytes, giving a target time period of approximately 16 seconds for voice data in 32-kilobytes per second ADPCM format.

If the high threshold value has not been exceeded, the preferred method returns to step 700 to stream another block of the message into the LTSR 230. If the high threshold value has been exceeded, the background stream manager 226 temporarily interrupts block streaming from the file server 110, and determines in step 714 whether a resume notification has been received. Receipt of a resume notification indicates that a low threshold value has been reached and block streaming must continue, as described in detail below. In response to receipt of a resume notification, the preferred method returns to step 700. In the absence of a resume notification, the background stream manager 226 determines whether a termination notification has been received in step 716. If so, the preferred method ends. Otherwise, the preferred method returns to step 706.

Referring again to FIG. 6A, after the background stream manager's execution has begun in step 608, the stream manager initiates execution of the foreground stream manager 224 in step 610 to begin streaming the voice message data within the LTSR 230 to the voice board unit 210. As streaming to the voice board unit 210 occurs, the foreground stream manager 224 updates the value of the playback position variable to indicate the most-current data within the message that has been played back to the subscriber in step 612.

After step 612, the foreground stream manager 224 determines whether the telephone-based playback operations were initiated in response to a client computer's issuance of a session request in step 614. If so, the foreground stream manager 224 issues a playback position notification to the appropriate client computer 130, 132, 134 in step 616. The playback position notification includes the current value of the playback position variable, which the client computer 130, 132, 134 uses to update the playback status window 402 and playback position slider 404 within the playback control interface 400.

Following step 614, or after step 616, the foreground stream manager 224 determines in step 618 whether the difference between the current values of the copy position and playback position variables is less than a low threshold value. If so, the amount of message data within the LTSR 230 that hasn't yet been streamed to the voice board unit 210 has reached a point at which another message block must be streamed from the file server 110 into the LTSR 230 to prevent message data depletion and ensure uninterrupted playback. If the low threshold value has been reached, the foreground stream manager 224 issues a resume notification to the background stream manager 226 in step 620. In the preferred embodiment, the low threshold value is 16 kilobytes, giving approximately 4 more seconds of uninterrupted playback time during which additional data blocks can be streamed into the LTSR 230.

After either of steps 618 or 620, the foreground stream manager 224 determines whether a playback command has been received in step 622. As previously indicated, a playback command is generated either through a subscriber's selection of 1) a telephone keypad button (i.e., via DTMF signals), or 2) a button or the playback position slider 404 within the playback control interface 400. In response to a playback command, the foreground stream manager 224 interrupts the streaming from the LTSR 230 to the voice board unit 210 in step 630. The foreground stream manager 224 subsequently determines whether the playback command is an exit playback command in step 632. An exit playback command would be generated, for example, in response to a subscriber's selection of another voice messaging command such as reply or delete; or termination of the playback control module's execution. If an exit playback command has been received, the foreground stream manager 224 terminates the streaming from the LTSR 230 to the voice board unit 210, and issues a termination notification to the background streaming unit 226 in step 634. The stream management unit 222 then deallocates the LTSR 230 and the block occupancy array 240 in step 636, after which the preferred method ends.

If no exit playback command has been received in step 632, the foreground stream manager 224 determines whether a stop playback command has been received in step 640. If so, the foreground stream manager 224 resets the playback position variable's value to the beginning of the message in step 642, and determines whether a stop timeout condition has been reached in step 644. If so, the preferred method proceeds to step 634. Otherwise, the foreground stream manager 224 determines in step 646 whether another playback command has been received. Receipt of another playback command causes the preferred method to return to step 632. If another playback command has not been received, the preferred method returns to step 644.

The absence of a stop playback command in step 640 causes the foreground stream manager 224 to determine whether a pause playback command has been received in step 650. If so, the foreground stream manager 224 determines in step 652 whether a pause timeout condition has occurred. If not, the foreground stream manager 224 determines whether another playback command has been received in step 654. Receipt of another playback command causes the preferred method to return to step 632. Otherwise, the preferred method returns to step 652.

In response to a pause timeout condition, the foreground stream manager 224 inserts the most-recent value of the playback position variable into a reposition notification, and issues the reposition notification to the background stream manager 226 in step 656 to resume message playback.

The absence of a pause playback command in step 650 indicates the subscriber has requested a jump forward or backward within the message. Thus, following step 650, the foreground stream manager 224 issues a reposition notification to the background streaming unit 226, where the reposition notification includes the updated value of the playback position variable corresponding to the subscriber-requested jump in step 656. Following step 656, the foreground stream manager 224 determines whether the playback command was received from a client computer 130, 132, 134 in step 658. If so, the foreground stream manager 224 issues an acknowledgment message to the appropriate client computer 130, 132, 134 in step 660. After step 660, or after step 658, the preferred method returns to step 610.

If in step 622 no playback command has been received, the foreground stream manager 224 determines in step 624 whether an end-of-message condition has been encountered during streaming from the LTSR 230 to the voice board unit 210. If not, the preferred method returns to step 610. Otherwise, the preferred method proceeds to step 642.

The present invention establishes a first data stream from a file server into a storage resource (or "stream cache"), and subsequently establishes a second data stream from the storage resource to a data destination. Thus, the present invention "streams from a stream." Preferably, the rate at which data can be streamed from the file server into the storage resource is faster than the rate at which data is depleted during streaming from the storage resource to the data destination. Through the use of high and low threshold conditions, the present invention facilitates the periodic interruption of streaming from the file server, while allowing for uninterrupted stream delivery to the data destination. This in turn maximizes the file server's ability to efficiently perform other tasks while streaming to the data destination occurs.

The present invention facilitates stream control through commands received via telephone or a client computer. Message data itself is not streamed to the client computer, thereby effectively eliminating data interruption problems that can arise when client computers are networked via slow links. The present invention additionally maintains a record of which data has been streamed into the storage resource, and uses this record to prevent re-streaming of data already in the storage resource when repositioning commands are received, further minimizing demands upon the file server.

While the present invention has been described with reference to certain preferred embodiments, those skilled in the art will recognize that various modifications can be provided. For example, the present invention could employ a different block size, high threshold value, and/or low threshold value depending upon system resource capabilities. As another example, one or more portions of the stream management unit 222 could be implemented via hardware. As a further example, in response to an end-of-message condition, the background stream manager 226 could determine whether the message data within the LTSR 230 contains any "holes" or missing data blocks as a result of repositioning commands, and automatically initiate streaming of the missing data blocks from the file server 110 into the LTSR 230. As yet another example, the teachings herein could be applied to voice message recording operations, such that the voice server 120 records a message into the LTSR 230 while simultaneously streaming the recorded message data to the file server 110 in background mode. The description herein provides for these and other variations upon the present invention, which is limited only by the following claims.

What is claimed is:

1. In a unified messaging system comprising a file server, a voice server, and a client computer coupled to a computer network, and further comprising a telephone system switch coupled to the voice server and a set of telephones, a method for voice message streaming comprising the steps of:

streaming message data from the file server into a storage resource upon the voice server;

streaming message data from the storage resource and terminating the stream at a data destination concurrent with the streaming of message data from the file server into the storage resource; and controlling the streaming of message data by a streaming control mechanism, wherein the streaming control mechanism sends control commands and is coupled to the voice server via a streaming control path, wherein the streaming control path is external to a path over which the message data is transmitted.

2. The method of claim 1, wherein the streaming into the storage resource occurs in a background execution mode and the streaming from the storage resource occurs in a foreground execution mode.

3. The method of claim 1, wherein the streaming into the storage resource occurs at a first data rate and the streaming from the storage resource occurs at a second data rate.

4. The method of claim 1, further comprising the steps of:

determining whether a first amount of message data has been streamed into the storage resource relative to a current address from which message data has been most-recently streamed from the storage resource; and interrupting the streaming into the storage resource.

5. The method of claim 4, further comprising the steps of:

determining whether a second amount of message data remains to be streamed from the storage resource relative to the current address; and resuming the streaming into the storage resource.

6. The method of claim 1, further comprising the steps of:

maintaining a current address indicating a location within the storage resource from which message data has been most-recently streamed;

determining whether message data streaming from the storage resource is to occur at a new address different from the current address;

determining whether message data corresponding to the new address is currently present within the storage resource; and avoiding a re-streaming of message data corresponding to the new address into the storage resource.

7. The method of claim 6, wherein the determining step is performed in response to a repositioning command received from one from a group of a telephone and the client computer.

8. The method of claim 7, wherein the repositioning command is generated by a user selection of a graphical control element displayed upon the client computer.

9. The method of claim 1, further comprising the steps of:

maintaining a current address indicating a location within the storage resource from which message data has been most-recently streamed; and issuing a position notification corresponding to the current address to the client computer.

10. In a unified messaging system comprising a file server, a voice server, and a client computer coupled to a computer network, and further comprising a telephone system switch coupled to the voice server and a set of telephones, a method for streaming message data from the file server to a telephone, the method comprising the steps of:

streaming message data from the file server into a storage resource upon the voice server;

streaming message data from within the storage resource and terminating the stream at a data destination;

determining whether a first amount of data has been streamed into the storage resource relative to a current address from which message data has been most-recently streamed from the storage resource;

interrupting the streaming of message data into the storage resource; and controlling the streaming of message data out of the storage resource by a streaming control mechanism, wherein the streaming control mechanism sends control commands and is coupled to the voice server via a streaming control path, wherein the streaming control path is external to a path over which the message data is transmitted.

11. The method of claim 10, further comprising the steps of:

determining whether a second amount of message data remains to be streamed from the storage resource relative to the current address; and resuming the streaming of message data into the storage resource.

12. The method of claim 11, further comprising the step of issuing a position notification corresponding to the current address to the client computer.

13. A computer-readable medium storing program instructions for causing a computer-controlled unified messaging system comprising a file server, a computer, and a voice server coupled to a computer network, and a telephone switch coupled to the voice server and a set of telephones, to perform the steps of:

streaming message data stored upon the file server into a storage resource upon the voice server;

streaming message data from within the storage resource and terminating the stream at a data destination concurrent with the streaming of message data from the file server into the storage resource; and controlling the streaming of message data by a streaming control mechanism, wherein the streaming control mechanism sends control commands and is coupled to the voice server via a streaming control path, wherein the streaming control path is external to a path over which the message data is transmitted.

14. The computer-readable medium of claim 13, wherein the program instructions stored thereupon cause the streaming of message data into the storage resource to occur at a first data rate, and the streaming of message data from the storage resource to occur at a second data rate.

15. The computer-readable medium of claim 13, further comprising program instructions for causing the computer-controlled unified messaging system to perform the steps of:

determining whether a first amount of message data has been streamed into the storage resource relative to a current address from which message data has been most-recently streamed from the storage resource; and interrupting the streaming of message data into the storage resource.

16. The computer-readable medium of claim 15, further comprising program instructions for causing the computer-controlled unified messaging system to perform the steps of:

determining whether a second amount of message data remains to be streamed from the storage resource relative to the current address; and resuming the streaming of message data into the storage resource.

17. The computer-readable medium of claim 16, further comprising program instructions for causing the computer-controlled unified messaging system to perform the steps of:

determining whether message data streaming from the storage resource is to occur at a new address different from the current address;

determining whether message data corresponding to the new address is currently present within the storage device; and avoiding a re-streaming of message data corresponding to the new address into the storage resource.

18. The computer-readable medium of claim 13, further comprising program instructions for causing the computer-controlled unified messaging system to perform the step of:

maintaining a current address indicating a location within the storage resource from which message data has been most-recently streamed; and issuing a position notification corresponding to the current address to the computer.

19. A unified messaging system providing cached message streams comprising:

a file server;

a telephone system switch coupled to a set of telephones;

a voice server coupled to the file server and the telephone system switch, the voice server comprising:

a processing unit;

a storage resource coupled to the processing unit;

a background stream manager that directs the streaming of message data stored upon the file server into the storage resource, the background stream manager coupled to the processing unit; and a foreground stream manager that directs the streaming of message data from the storage resource and terminating the stream at a data destination, the foreground stream manager coupled to the processing unit; and a client computer for controlling the streaming of message data, wherein the client computer sends control commands and is coupled to the voice server via a streaming control path, wherein the streaming control path is external to a path over which the message data is transmitted.

20. The unified messaging system of claim 19, wherein the client computer comprises:

a processing unit;

a display device; and a memory coupled to the processing unit and the display device, the memory comprising a playback control module responsive to message position notifications received from the voice server.

21. The method of claim 1, wherein the streaming control path is of a higher-latency than the streaming path.

22. The method of claim 10, wherein the streaming control path is of a higher-latency than the streaming path.

23. The method of claim 19, wherein the streaming control path is of a higher-latency than the streaming path.

24. The method of claim 1, wherein the data destination is a voice board unit.

25. The method of claim 10, wherein the data destination is a voice board unit.

26. The computer-readable medium of claim 13, wherein the data destination is a voice board unit.

27. The unified messaging system of claim 19, wherein the data destination is a voice board unit.

* * * * *

UNITED STATES PATENT AND TRADEMARK OFFICE
CERTIFICATE OF CORRECTION

PATENT NO. : 6,396,907 B1
APPLICATION NO. : 08/948536
DATED : May 28, 2002
INVENTOR(S) : Cliff Didcock It is certified that error appears in the above-identified patent and that said Letters Patent is hereby corrected as shown below:

IN THE SPECIFICATION

In column 2, line 45, replace "blocks 1 through (Nu-)" with -- blocks 1 through (N-1) --.

IN THE CLAIMS

In column 11, line 65 for claim 1, add -- for a separate telephone that corresponds to the streaming control mechanism -- after "control mechanism".

In column 12, line 66 for claim 10, add -- for a separate telephone that corresponds to the streaming control mechanism -- after "control mechanism".

In column 13, line 29 for claim 13, add -- for a separate telephone that corresponds to the streaming control mechanism -- after "control mechanism".

In column 14, line 34 for claim 19, add -- for a telephone that corresponds to the client computer -- after "data".

Signed and Sealed this

Nineteenth Day of February, 2008

JON W. DUDAS
*Director of the United States Patent and Trademark Office*